(12) United States Patent
Hu et al.

(10) Patent No.: US 11,799,083 B2
(45) Date of Patent: Oct. 24, 2023

(54) LITHIATION ADDITIVE FOR A POSITIVE ELECTRODE

(71) Applicant: GM GLOBAL TECHNOLOGY OPERATIONS LLC, Detroit, MI (US)

(72) Inventors: Jiazhi Hu, Troy, MI (US); Gongshin Qi, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 131 days.

(21) Appl. No.: 17/446,116

(22) Filed: Aug. 26, 2021

(65) Prior Publication Data

US 2023/0069776 A1 Mar. 2, 2023

(51) Int. Cl.
*H01M 4/00* (2006.01)
*H01M 4/525* (2010.01)
*H01M 4/58* (2010.01)
*H01M 4/505* (2010.01)
*H01M 4/02* (2006.01)

(52) U.S. Cl.
CPC ........... *H01M 4/525* (2013.01); *H01M 4/505* (2013.01); *H01M 4/582* (2013.01); *H01M 4/5805* (2013.01); *H01M 2004/027* (2013.01); *H01M 2004/028* (2013.01)

(58) Field of Classification Search
CPC ......... Y02E 60/10; H01M 4/62; H01M 4/139; H01M 4/38; H01M 10/052; H01M 4/625; H01M 4/04
See application file for complete search history.

(56) References Cited

U.S. PATENT DOCUMENTS 5,871,720 A 2/1999 Gutierrez et al.
6,060,184 A 5/2000 Gan et al.
(Continued)

FOREIGN PATENT DOCUMENTS

CN 103779550 A 5/2014
CN 103943819 A 7/2014
(Continued)

OTHER PUBLICATIONS

Nose, Positive Electrode Composite and Manufacturing Method Thereof, Dec. 2019, See the Abstract. (Year: 2019).*
(Continued)

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

The present disclosure provides an electrochemical cell that cycles lithium ions. The electrochemical cell includes a positive electrode and a negative electrode. The positive electrode includes a positive electroactive material and a lithiation additive blended with the positive electroactive material. The lithiation additive includes a lithium-containing material and one or more metals. The lithium-containing material is represented by LiX, where X is hydrogen (H), oxygen (O), nitrogen (N), fluorine (F), phosphorous (P), or sulfur (S). The one or more metals are selected from the group consisting of: iron (Fe), copper (Cu), cobalt (Co), manganese (Mn), and combinations thereof. The negative electrode may include a volume-expanding negative electroactive material.

20 Claims, 2 Drawing Sheets

(56) References Cited

U.S. PATENT DOCUMENTS

| | | |
|---|---|---|
| 6,451,487 B1 | 9/2002 | Besner et al. |
| 7,018,607 B2 | 3/2006 | Nazri et al. |
| 7,285,260 B2 | 10/2007 | Armand et al. |
| 7,457,018 B2 | 11/2008 | Armand et al. |
| 7,491,467 B2 | 2/2009 | Satoh et al. |
| 7,651,732 B2 | 1/2010 | Cheng et al. |
| 7,722,994 B2 | 5/2010 | Halalay |
| 7,736,805 B2 | 6/2010 | Nazri et al. |
| 8,101,152 B1 | 1/2012 | Halalay et al. |
| 8,148,455 B2 | 4/2012 | Posudievsky et al. |
| 8,247,116 B2 | 8/2012 | He et al. |
| 8,309,644 B1 | 11/2012 | Huang |
| 8,394,539 B2 | 3/2013 | Geiculescu et al. |
| 8,455,140 B1 | 6/2013 | Huang et al. |
| 8,460,591 B2 | 6/2013 | Huang et al. |
| 8,460,829 B1 | 6/2013 | Huang et al. |
| 8,470,468 B2 | 6/2013 | Xiao et al. |
| 8,470,898 B2 | 6/2013 | Huang |
| 8,586,222 B2 | 11/2013 | Timmons et al. |
| 8,802,301 B2 | 8/2014 | Halalay et al. |
| 9,034,519 B2 | 5/2015 | Xiao et al. |
| 9,059,451 B2 | 6/2015 | Xiao et al. |
| 9,123,939 B2 | 9/2015 | Xiao et al. |
| 9,160,036 B2 | 10/2015 | Yang et al. |
| 9,252,411 B2 | 2/2016 | Abd Elhamid et al. |
| 9,302,914 B2 | 4/2016 | Liu et al. |
| 9,350,046 B2 | 5/2016 | Huang |
| 9,362,552 B2 | 6/2016 | Sohn et al. |
| 9,362,560 B2 | 6/2016 | Nazri |
| 9,373,829 B2 | 6/2016 | Xiao et al. |
| 9,437,871 B2 | 9/2016 | Zhou et al. |
| 9,531,004 B2 | 12/2016 | Xiao et al. |
| 9,627,716 B2 | 4/2017 | Yang et al. |
| 9,647,254 B2 | 5/2017 | Dadheech et al. |
| 9,742,028 B2 | 8/2017 | Zhou et al. |
| 9,896,763 B2 | 2/2018 | Dadheech et al. |
| 9,937,481 B1 | 4/2018 | Liu et al. |
| 10,497,927 B2 | 12/2019 | Xiao |
| 10,903,491 B2 | 1/2021 | Xiao et al. |
| 11,417,888 B2 | 8/2022 | Xiao et al. |
| 11,515,538 B2 | 11/2022 | Li et al. |
| 2004/0018430 A1 | 1/2004 | Holman et al. |
| 2007/0238023 A1 | 10/2007 | Gorshkov et al. |
| 2008/0131783 A1 | 6/2008 | Choi et al. |
| 2008/0226987 A1 | 9/2008 | Yumoto et al. |
| 2008/0261116 A1 | 10/2008 | Burton et al. |
| 2009/0136415 A1 | 5/2009 | Gorshkov et al. |
| 2009/0140742 A1 | 6/2009 | Koch et al. |
| 2009/0253042 A1 | 10/2009 | Sun et al. |
| 2009/0325071 A1 | 12/2009 | Verbrugge et al. |
| 2010/0079145 A1 | 4/2010 | Meisner et al. |
| 2010/0143790 A1 | 6/2010 | Inagaki et al. |
| 2010/0272612 A1 | 10/2010 | Ramamurthy |
| 2011/0017528 A1 | 1/2011 | Kumar et al. |
| 2011/0044886 A1 | 2/2011 | Gorshkov et al. |
| 2011/0086249 A1 | 4/2011 | Timmons |
| 2011/0086294 A1 | 4/2011 | Xiao et al. |
| 2011/0091768 A1 | 4/2011 | Ohashi et al. |
| 2011/0111308 A1 | 5/2011 | Halalay et al. |
| 2011/0121225 A1 | 5/2011 | Posudievsky et al. |
| 2011/0151333 A1 | 6/2011 | Halalay et al. |
| 2011/0155962 A1 | 6/2011 | Choi |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0223490 A1 | 9/2011 | Andou et al. |
| 2011/0224928 A1 | 9/2011 | Lin et al. |
| 2011/0250478 A1 | 10/2011 | Timmons et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0121989 A1 | 5/2012 | Roberts et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0208087 A1 | 8/2012 | Yamamoto et al. |
| 2012/0219852 A1 | 8/2012 | Huang et al. |
| 2012/0227252 A1 | 9/2012 | Nazri |
| 2012/0229096 A1 | 9/2012 | Nazri |
| 2012/0231321 A1 | 9/2012 | Huang et al. |
| 2012/0231325 A1 | 9/2012 | Yoon et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0295155 A1 | 11/2012 | Deng et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1 | 7/2013 | Wang et al. |
| 2013/0183582 A1 | 7/2013 | Halalay et al. |
| 2013/0189576 A1 | 7/2013 | Verbrugge et al. |
| 2013/0224602 A1 | 8/2013 | Huang |
| 2013/0227252 A1 | 8/2013 | Gopal et al. |
| 2013/0234674 A1 | 9/2013 | Nazri |
| 2013/0284338 A1 | 10/2013 | Xiao et al. |
| 2013/0319599 A1 | 12/2013 | Huang |
| 2013/0323585 A1 | 12/2013 | Inoue et al. |
| 2013/0323595 A1 | 12/2013 | Sohn et al. |
| 2014/0023931 A1 | 1/2014 | Huang |
| 2014/0038024 A1 | 2/2014 | Huang |
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2014/0375325 A1 | 12/2014 | Wang et al. |
| 2015/0014890 A1 | 1/2015 | Xiao |
| 2015/0056387 A1 | 2/2015 | Dadheech et al. |
| 2015/0056493 A1 | 2/2015 | Dadheech et al. |
| 2015/0056507 A1 | 2/2015 | Dadheech et al. |
| 2015/0056517 A1 | 2/2015 | Zhou et al. |
| 2015/0093626 A1 | 4/2015 | Fuller et al. |
| 2015/0093628 A1 | 4/2015 | Halalay et al. |
| 2015/0093639 A1 | 4/2015 | Halalay et al. |
| 2015/0162583 A1 | 6/2015 | Dadheech et al. |
| 2015/0236324 A1 | 8/2015 | Xiao et al. |
| 2015/0236343 A1 | 8/2015 | Xiao et al. |
| 2015/0246816 A1 | 9/2015 | Liu et al. |
| 2015/0333318 A1 | 11/2015 | Huang et al. |
| 2015/0348307 A1 | 12/2015 | Lee et al. |
| 2015/0349307 A1 | 12/2015 | Dadheech et al. |
| 2016/0006024 A1 | 1/2016 | Xiao et al. |
| 2016/0020453 A1 | 1/2016 | Liu et al. |
| 2016/0020491 A1 | 1/2016 | Dai et al. |
| 2016/0141598 A1 | 5/2016 | Dai et al. |
| 2016/0149206 A1 | 5/2016 | Liu |
| 2016/0172665 A1 | 6/2016 | Zhou et al. |
| 2016/0172681 A1 | 6/2016 | Yang et al. |
| 2016/0172706 A1 | 6/2016 | Xiao et al. |
| 2016/0172710 A1 | 6/2016 | Liu et al. |
| 2016/0172711 A1 | 6/2016 | Yang et al. |
| 2016/0211498 A1 | 7/2016 | Kim et al. |
| 2016/0218342 A1 | 7/2016 | Xiao et al. |

(56) References Cited

U.S. PATENT DOCUMENTS

| | | |
|---|---|---|
| 2016/0254567 A1 | 9/2016 | Cai et al. |
| 2016/0365558 A1 | 12/2016 | Kia et al. |
| 2016/0372743 A1 | 12/2016 | Cho et al. |
| 2017/0077520 A1 | 3/2017 | Wu et al. |
| 2017/0141382 A1 | 5/2017 | Dadheech et al. |
| 2017/0141383 A1 | 5/2017 | Dadheech et al. |
| 2017/0155175 A1 | 6/2017 | Halalay et al. |
| 2017/0162859 A1 | 6/2017 | Yang et al. |
| 2017/0179469 A1 | 6/2017 | Jiang et al. |
| 2017/0179482 A1 | 6/2017 | Verbrugge et al. |
| 2017/0214079 A1 | 7/2017 | Dai et al. |
| 2017/0222210 A1 | 8/2017 | Xiao |
| 2017/0271678 A1 | 9/2017 | Yang et al. |
| 2017/0288209 A1 | 10/2017 | Liu |
| 2017/0288230 A1 | 10/2017 | Yang et al. |
| 2017/0338490 A1 | 11/2017 | Xiao et al. |
| 2018/0006342 A1 | 1/2018 | Lee et al. |
| 2018/0048022 A1 | 2/2018 | Yang et al. |
| 2018/0108952 A1 | 4/2018 | Yang et al. |
| 2018/0123124 A1 | 5/2018 | Yang et al. |
| 2018/0151887 A1 | 5/2018 | Yang et al. |
| 2018/0198115 A1 | 7/2018 | Yu et al. |
| 2018/0287207 A1 | 10/2018 | Dai et al. |
| 2018/0309165 A1 | 10/2018 | Yersak et al. |
| 2018/0309166 A1 | 10/2018 | Yersak et al. |
| 2018/0309169 A1 | 10/2018 | Yang et al. |
| 2018/0358656 A1 | 12/2018 | Deng |
| 2018/0375148 A1 | 12/2018 | Yersak et al. |
| 2019/0051926 A1 | 2/2019 | Chao et al. |
| 2019/0067675 A1 | 2/2019 | Xiao |
| 2019/0165410 A1 | 5/2019 | Yu et al. |
| 2020/0220172 A1 | 7/2020 | Xiao et al. |
| 2020/0321617 A1 | 10/2020 | Xiao |
| 2020/0350558 A1 | 11/2020 | Jimenez et al. |
| 2020/0388824 A1 | 12/2020 | Sachdev et al. |
| 2021/0020899 A1 | 1/2021 | Halalay et al. |
| 2021/0083264 A1 | 3/2021 | Jiang et al. |
| 2021/0083294 A1 | 3/2021 | Xiao et al. |
| 2021/0111407 A1 | 4/2021 | Li et al. |
| 2021/0151787 A1 | 5/2021 | Xiao et al. |
| 2021/0159493 A1 | 5/2021 | Xiao et al. |
| 2021/0218057 A1 | 7/2021 | Dai et al. |
| 2022/0102756 A1 | 3/2022 | Frieberg et al. |
| 2022/0109151 A1 | 4/2022 | Fortier et al. |
| 2022/0123279 A1 | 4/2022 | Mao et al. |
| 2022/0376542 A1 | 11/2022 | Xu et al. |
| 2023/0006201 A1 | 1/2023 | Wang et al. |

FOREIGN PATENT DOCUMENTS

| | | | |
|---|---|---|---|
| CN | 109428057 A | 3/2019 | |
| DE | 102013220351 A1 | 4/2014 | |
| DE | 102018121026 A1 | 2/2019 | |
| JP | 2018018581 A * | 2/2018 | ............ Y02E 60/10 |
| JP | 2018049848 A * | 3/2018 | ........ C01G 45/1242 |
| JP | 2019212447 A * | 12/2019 | ............ F04C 29/124 |
| WO | WO-2014022986 A1 | 2/2014 | |
| WO | WO-2014182281 A1 | 11/2014 | |
| WO | WO-2015126649 A1 | 8/2015 | |
| WO | WO-2017045573 A1 | 3/2017 | |

OTHER PUBLICATIONS

Kajimoto et al, Lithium Ion Battery, Feb. 2018, See the Abstract. (Year: 2018).*

Phillip et al, Improved Lithium Manganese Oxide Compositions, Mar. 2018, See the Abstract. (Year: 2018).*

Wang, Lei et al., U.S. Appl. No. 17/363,985, filed Jun. 30, 2021 entitled "Over-Lithiated Cathode Materials and Methods of Forming the Same," 47 pages.

Fortier, Mary E. et al., U.S. Appl. No. 17/062,358, filed Oct. 2, 2020 entitled "Over-Lithiated Cathode Material," 36 pages.

Aurbach, Doron, et al., "Design of electrolyte solutions for Li and Li-ion batteries: a review," Electrochimica Acta, vol. 50, pp. 247-254 (2004) (published online Aug. 3, 2004).

Bai, Ying, et al., "Microstructure and electrochemical performances of LiF-coated spinel $LiMn_2O_4$," Transactions of Nonferrous Metals Society of China, vol. 17, pp. s892-s896 (2007).

Gaines, Linda, et al., "Costs of Lithium-Ion Batteries for Vehicles," Argonne National Laboratory, Center for Transportation Research (May 2000).

George, Steven M., "Atomic Layer Deposition: An Overview," Chem. Rev., vol. 110, No. 1, pp. 111-131 (2010) (published online Nov. 30, 2009).

Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Leskela, Markku, et al., "Atomic layer deposition (ALD): from precursors to thin film structures," Thin Solid Films, vol. 409, pp. 138-146 (2002).

Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2 pages).

Qin, Yan, et al., "Mechanism of LTO Gassing and potential solutions," Argonne National Laboratory Presentation, May 9-13, 2011 (18 pages).

Ramadass, Premanand, et al., "Mathematical Modeling of SEI Formation in Li-Ion Cell Anodes," 202nd Meeting of The Electrochemical Society—Salt Lake City, UT, Oct. 20-25, 2002, (Abstract) (10 pages) (Oct. 23, 2002).

Vetter, J., et al., "Ageing mechanisms in lithium-ion batteries," J. Power Sources, vol. 147, Nos. 1-2, pp. 269-281 (Sep. 9, 2005).

Huntsman Corporation, Jeffamine.RTM. ED-2003 Polyetheramine Technical Bulletin, Form 5197-0208 (2007) (2 pages).

Franssila, Sami, Introduction to Microfabrication, Second Ed., p. 53 (2010).

Lee, D.J., Lee, H., Song, J., Ryou, M.- H., Lee, Y.M., Kim, H.-T., Park, J.-K.—Composite protective layer for Li metal anode in high-performance lithium-oxygen batteries, Electrochemistry Communications 40 (2014), pp. 45-48 (Year: 2014).

Yasuoka, H., Yoshida, M., Sugita, K., Ohdaira, K., Murata, H., Matsumura, H.—Fabrication of PTFE thin films by dual catalytic chemical vapor deposition method, Thin Solid Films 516 (2008), pp. 687-690 (Year: 2008).

Xue-Qiang Zhang et al.; "Fluoroethylene Carbonate Additives to Render uniform Li Deposits in Lithium Metal Batteries"; Advanced Functional Materials 2017, 27, 1605989; 8 pages.

Elena Markevich et al.; "Fluoroethylene Carbonate as an Important Component for the Formation of an Effective Solid Electrolyte Interphase on Anodes and Cathode for Advanced Li-Ion Batteries"; American Chemical Society Energy Letters 2017, 2; May 5, 2017; pp. 1337-1345.

Soshi Shiraishi et al.; "Electric Double Layer Capacitance of Highly Porous Carbon Derived from Lithium Metal and Polytetrafluoroethylene"; Electrochemical and Solid-State Letters, 4(1); 2001; pp. A5-A8.

* cited by examiner

LITHIATION ADDITIVE FOR A POSITIVE ELECTRODE

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Conventional rechargeable lithium-ion batteries operate by reversibly passing lithium ions back and forth between the negative electrode and the positive electrode. For example, lithium ions may move from the positive electrode to the negative electrode during charging of the battery, and in the opposite direction when discharging the battery. Such lithium-ion batteries can reversibly supply power to an associated load device on demand. More specifically, electrical power can be supplied to a load device by the lithium-ion battery until the lithium content of the negative electrode is effectively depleted. The battery may then be recharged by passing a suitable direct electrical current in the opposite direction between the electrodes.

During discharge, the negative electrode may contain a comparatively high concentration of intercalated lithium, which is oxidized into lithium ions releasing electrons. Lithium ions may travel from the negative electrode to the positive electrode, for example, through the ionically conductive electrolyte solution contained within the pores of an interposed porous separator. Concurrently, electrons pass through an external circuit from the negative electrode to the positive electrode. Such lithium ions may be assimilated into the material of the positive electrode by an electrochemical reduction reaction. The battery may be recharged or regenerated after a partial or full discharge of its available capacity by an external power source, which reverses the electrochemical reactions that transpired during discharge.

In various instances, however, a portion of the intercalated lithium remains with the negative electrode following the first cycle due to, for example, conversion reactions and/or the formation of a solid electrolyte interphase (SEI) layer on the negative electrode during the first cycle, as well as ongoing lithium loss due to, for example, continuous solid electrolyte interphase breakage. Such permanent loss of lithium ions may result in a decreased specific energy and power in the battery resulting from, for example, added positive electrode mass that does not participate in the reversible operation of the battery. For example, the lithium-ion battery may experience an irreversible capacity loss of greater than or equal to about 5% to less than or equal to about 30% after the first cycle, and in the instance of silicon-containing negative electrodes, or other volume-expanding negative electroactive materials (e.g., tin (Sn), aluminum (Al), germanium (Ge)), an irreversible capacity loss of greater than or equal to about 20% to less than or equal to about 40% after the first cycle.

Current methods to compensate for first cycle lithium loss include, for example, electrochemical processes where a silicon-containing anode is lithiated using an electrolyte bath. However, such processes are susceptible to electrolyte pollution, and as a result, instability. Another method of compensation includes, for example, in-cell lithiation, which includes adding lithium to a cell. Such processes, however, require the use of mesh current collectors, which have high material costs, as well as coating costs. Yet another method of compensation includes, for example, the deposition (e.g., spraying or extrusion or physical vapor deposition (PVD)) of lithium on an anode or anode material. However, in such instances, it is difficult (and costly) to produce evenly deposited lithium layers. Accordingly, it would be desirable to develop improved electrodes and electroactive materials, and methods of using the same, that can address these challenges.

SUMMARY

This section provides a general summary of the disclosure, and is not a comprehensive disclosure of its full scope or all of its features.

The present disclosure relates to lithiation additives for use in an electrochemical cell that cycles lithium ions, for example in the positive electrode and mixed with the positive electroactive material, and methods of using the same.

In various aspects, the present disclosure provides a lithiation additive for a positive electrode. The lithiating additive may include a lithium-containing material and one or more metals. The lithium-containing material may be represented by LiX, where X is hydrogen (H), oxygen (O), nitrogen (N), fluorine (F), phosphorous (P), or sulfur (S). The one or more metals may be selected from the group consisting of: iron (Fe), copper (Cu), cobalt (Co), manganese (Mn), and combinations thereof.

In one aspect, the lithiation additive may include greater than or equal to about 0.1 wt. % to less than or equal to about 95 wt. % of the lithium-containing material, and greater than or equal to about 0.1 wt. % to less than or equal to about 95 wt. % of the one or more metals.

In one aspect, the positive electrode may include greater than or equal to about 0.1 wt. % to less than or equal to about 30 wt. % of the lithiation additive.

In one aspect, the lithium-containing material may be lithium fluoride (LiF), and the one or more metals may include iron (Fe).

In one aspect, the positive electrode may include a positive electroactive material, and the lithiation additive may be blended with the positive electroactive material.

In one aspect, the positive electroactive material maybe selected from the group consisting of: NCM 111, NCM 532, NCM 622, NCM 611, NCMA, LFP, LMO, LFMP, LLC, and combinations thereof.

In various aspects, the present disclosure provides a positive electroactive material layer. The positive electroactive material layer may include a positive electroactive material, and a lithiation additive blended with the positive electroactive material. The lithiation additive may include a lithium-containing material and one or more metals. The lithium-containing material may be represented by LiX, where X is hydrogen (H), oxygen (O), nitrogen (N), fluorine (F), phosphorous (P), or sulfur (S).

In one aspect, the one or more metals may be selected from the group consisting of: iron (Fe), copper (Cu), cobalt (Co), manganese (Mn), and combinations thereof.

In one aspect, the lithiation additive may include greater than or equal to about 0.1 wt. % to less than or equal to about 95 wt. % of the lithium-containing material, and greater than or equal to about 0.1 wt. % to less than or equal to about 95 wt. % of the one or more metals.

In one aspect, the positive electrode may include greater than or equal to about 0.1 wt. % to less than or equal to about 30 wt. % of the lithiation additive.

In one aspect, the positive electroactive material may be selected from the group consisting of: NCM 111, NCM 532, NCM 622, NCM 611, NCMA, LFP, LMO, LFMP, LLC, and combinations thereof.

In one aspect, the lithium-containing material may be lithium fluoride (LiF), and the one or more metals may include iron (Fe).

In various aspects, the present disclosure provides an electrochemical cell that cycles lithium ions. The electrochemical cell may include a positive electrode. The positive electrode may include a positive electroactive material, and a lithiation additive blended with the positive electroactive material. The lithiation additive may include a lithium-containing material and one or more metals. The lithium-containing material may be represented by LiX, where X is hydrogen (H), oxygen (O), nitrogen (N), fluorine (F), phosphorous (P), or sulfur (S).

In one aspect, the one or more metals may be selected from the group consisting of: iron (Fe), copper (Cu), cobalt (Co), manganese (Mn), and combinations thereof.

In one aspect, the lithiation additive may include greater than or equal to about 0.1 wt. % to less than or equal to about 95 wt. % of the lithium-containing material, and greater than or equal to about 0.1 wt. % to less than or equal to about 95 wt. % of the one or more metals.

In one aspect, the positive electrode includes greater than or equal to about 0.1 wt. % to less than or equal to about 30 wt. % of the lithiation additive.

In one aspect, the positive electroactive material may be selected from the group consisting of: NCM 111, NCM 532, NCM 622, NCM 611, NCMA, LFP, LMO, LFMP, LLC, and combinations thereof.

In one aspect, the electrochemical cell may further include a negative electrode. The negative electrode includes a negative electroactive material.

In one aspect, the negative electroactive material may be a volume-expanding negative electroactive material.

In one aspect, the lithium-containing material may be lithium fluoride (LiF), and the one or more metals comprise iron (Fe).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
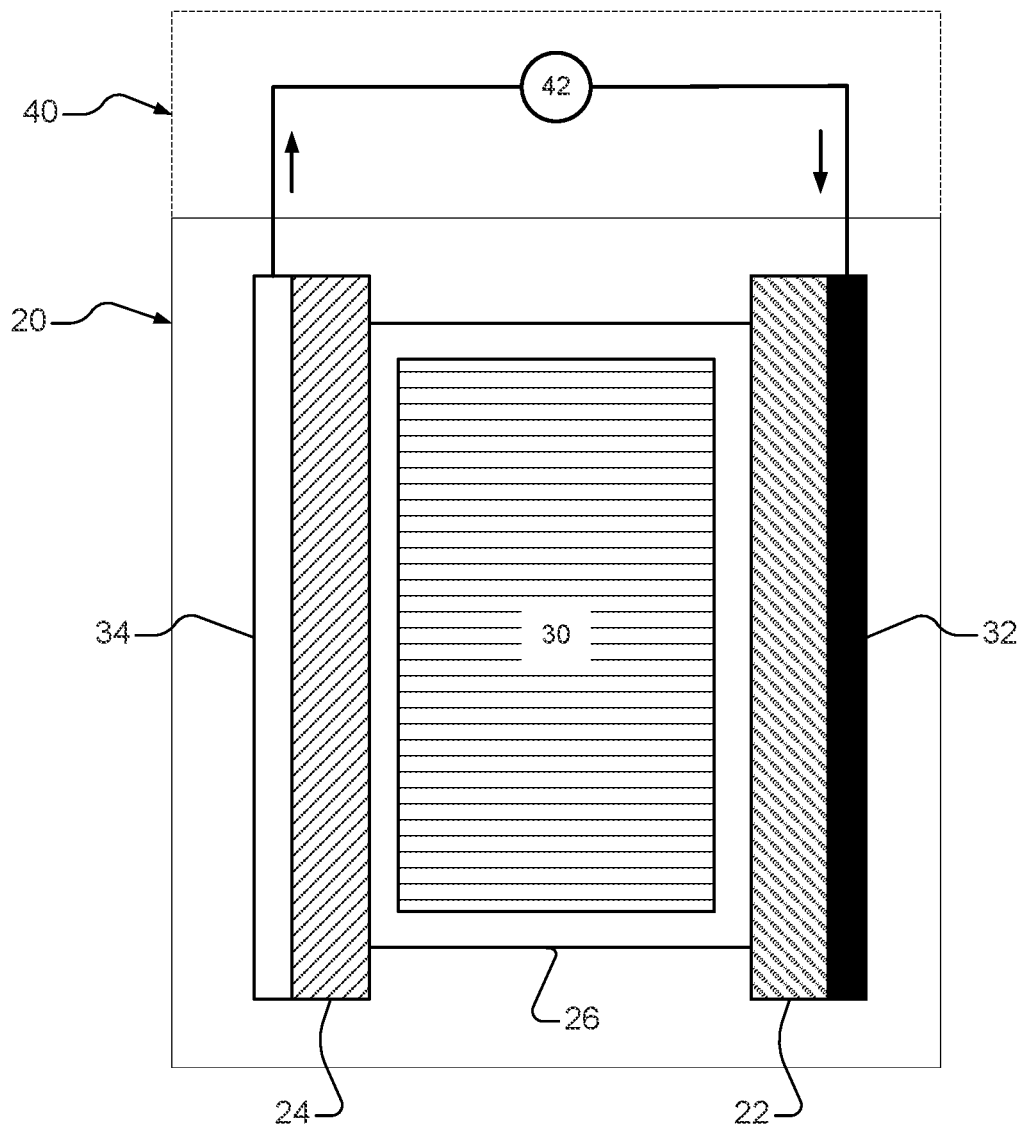
FIG. 1 is a schematic of an example electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A typical lithium-ion battery includes a first electrode (such as a positive electrode or cathode) opposing a second electrode (such as a negative electrode or anode) and a separator and/or electrolyte disposed therebetween. Often, in a lithium-ion battery pack, batteries or cells may be electrically connected in a stack or winding configuration to increase overall output. Lithium-ion batteries operate by reversibly passing lithium ions between the first and second electrodes. For example, lithium ions may move from a positive electrode to a negative electrode during charging of the battery, and in the opposite direction when discharging the battery. The electrolyte is suitable for conducting lithium ions (or sodium ions in the case of sodium-ion batteries, and the like) and may be in liquid, gel, or solid form. For example, an exemplary and schematic illustration of an electrochemical cell (also referred to as the battery) 20 is shown in FIG. 1.

Such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single positive electrode cathode and a single anode, the skilled artisan will recognize that the present teachings extend to various other configurations, including those having one or more cathodes and one or more anodes, as well as various current collectors with electroactive layers disposed on or adjacent to one or more surfaces thereof.

The battery 20 includes a negative electrode 22 (e.g., anode), a positive electrode 24 (e.g., cathode), and a separator 26 disposed between the two electrodes 22, 24. The separator 26 provides electrical separation—prevents physical contact—between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte. For example, the separator 26 may be defined by a plurality of solid-state electrolyte particles (not shown).

A negative electrode current collector 32 may be positioned at or near the negative electrode 22. The negative electrode current collector 32 may be a metal foil, metal grid or screen, or expanded metal comprising copper or any other appropriate electrically conductive material known to those of skill in the art. A positive electrode current collector 34 may be positioned at or near the positive electrode 24. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, the present technology also applies to solid-state batteries that include solid-state electrolytes and/or solid-state electroactive particles that may have different designs as known to those of skill in the art.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. In certain aspects, the electrolyte 30 may be a non-aqueous liquid electrolyte solution (e.g., >1M) that includes a lithium salt dissolved in an organic solvent or a mixture of organic solvents. Numerous conventional non-aqueous liquid electrolyte 30 solutions may be employed in the lithium-ion battery 20.

In certain aspects, the electrolyte 30 may be a non-aqueous liquid electrolyte solution that includes one or more lithium salts dissolved in an organic solvent or a mixture of organic solvents. For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof.

These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic materials and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have a thickness greater than or equal to about 1 μm to less than or equal to about 50 μm, and in certain instances, optionally greater than or equal to about 1 μm to less than or equal to about 20 μm. The separator 26 may have a thickness greater than or equal to 1 μm to less than or equal to 50 μm, and in certain instances, optionally greater than or equal to 1 μm to less than or equal to 20 μm.

In various aspects, the porous separator 26 and/or the electrolyte 30 disposed in the porous separator 26 as illustrated in FIG. 1 may be replaced with a solid-state electrolyte ("SSE") layer (not shown) that functions as both an electrolyte and a separator. The solid-state electrolyte layer may be disposed between the positive electrode 24 and negative electrode 22. The solid-state electrolyte layer facilitates transfer of lithium ions, while mechanically separating and providing electrical insulation between the negative and positive electrodes 22, 24. By way of non-limiting example, the solid-state electrolyte layer may include a plurality of solid-state electrolyte particles, such as $LiTi_2(PO_4)_3$, $LiGe_2(PO_4)_3$, $Li_7La_3Zr_2O_{12}$, $Li_3xLa_{2/3}-xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof. The solid-state electrolyte particles may be nanometer sized oxide-based solid-state electrolyte particles. In still other variations, the porous separator 26 and/or the electrolyte 30 in FIG. 1 may be replaced with a gel electrolyte.

The negative electrode 22 may be formed from a lithium host material (or a sodium-based active material in the instance of sodium-ion batteries) that is capable of functioning as a negative terminal of the battery 20. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, in certain variations, the negative electrode 22 may include a plurality of solid-state electrolyte particles (not shown). In each instance, the negative electrode 22 (including the one or more layers) may have a thickness greater than or equal to about 1 μm to less than or equal to about 500 μm, and in certain aspects, optionally greater than or equal to about 10 μm to less than or equal to about 200 μm. The negative electrode 22 (including the one or more layers) may have a thickness greater than or equal to 1 μm to less than or equal to 500 μm, and in certain aspects, optionally greater than or equal to 10 μm to less than or equal to 200 μm.

The negative electrode 22 may include a negative electroactive material that comprises lithium, such as, for example, lithium metal. In certain variations, the negative electrode may be a film or layer formed of lithium metal. Other materials can also be used to form the negative electrode 22, including, for example, carbonaceous materials (such as, graphite, hard carbon, soft carbon), and/or lithium-silicon, silicon containing binary and ternary alloys, and/or tin-containing alloys (such as, Si, Li—Si, $SiO_x$ (where 0≤x≤2), Si—Sn, SiSnFe, SiSnAl, SiFeCo, $SnO_2$, and the like), and/or other volume-expanding materials (e.g., aluminum (Al), germanium (Ge), tin (Sn)). For example, in certain variations, the negative electroactive material may include a carbonaceous-silicon based composite including, for example, about 10 wt. % $SiO_x$ (where 0≤x≤2) and about 90 wt. % graphite. The negative electroactive material may include a carbonaceous-silicon based composite including, for example, 10 wt. % $SiO_x$ (where 0≤x≤2) and 90 wt. % graphite.

In certain variations, the negative electroactive material(s) in the negative electrode 22 may be optionally intermingled with one or more electrically conductive materials that provide an electron conductive path and/or at least one polymeric binder material that improves the structural integrity of the negative electrode 22. For example, the negative electroactive material(s) in the negative electrode 22 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

In various aspects, the negative electrode 22 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 95 wt. %, of the negative electroactive material(s); greater than or equal to 0 wt. % to less than or equal to about 40 wt. %, and in certain aspects, optionally greater than or equal to about 1 wt. % to less than or equal to about 20 wt. %, of the electronically conducting material; and greater than or equal to 0 wt. % to less than or equal to about 40 wt. %, and in certain aspects, optionally greater than or equal to about 1 wt. % to less than or equal to about 20 wt. %, of the at least one polymeric binder.

In various aspects, the negative electrode 22 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 95 wt. %, of the negative electroactive material(s); greater than or equal to 0 wt. % to less than or equal to 40 wt. %, and in certain aspects, optionally greater than or equal to 1 wt. % to less than or equal to 20 wt. %, of the electronically conducting material; and greater than or equal to 0 wt. % to less than or equal to 40 wt. %, and in certain aspects, optionally greater than or equal to 1 wt. % to less than or equal to 20 wt. %, of the at least one polymeric binder.

The positive electrode 24 may be formed from a lithium-based active material (or a sodium-based active material in the instance of sodium-ion batteries) that is capable of undergoing lithium intercalation and deintercalation, alloying and dealloying, or plating and stripping, while functioning as the positive terminal of the battery 20. The positive electrode 24 can be defined by a plurality of electroactive material particles (not shown). Such positive electroactive material particles may be disposed in one or more layers so as to define the three-dimensional structure of the positive electrode 24. The electrolyte 30 may be introduced, for example after cell assembly, and contained within pores (not shown) of the positive electrode 24. For example, in certain variations, the positive electrode 24 may include a plurality of solid-state electrolyte particles (not shown). In each instance, the positive electrode 24 may have a thickness greater than or equal to about 1 μm to less than or equal to about 500 μm, and in certain aspects, optionally greater than or equal to about 10 μm to less than or equal to about 200 μm. The positive electrode 24 may have a thickness greater than or equal to 1 μm to less than or equal to 500 μm, and in certain aspects, optionally greater than or equal to 10 μm to less than or equal to 200 μm.

One exemplary common class of known materials that can be used to form the positive electrode 24 is layered lithium transitional metal oxides. For example, in certain aspects, the positive electrode 24 may comprise one or more materials having a spinel structure, such as lithium manganese oxide ($Li_{(1+x)}Mn_2O_4$, where $0.1 \leq x \leq 1$) (LMO), lithium manganese nickel oxide ($LiMn_{(2-x)}Ni_xO_4$, where $0 \leq x \leq 0.5$) (NMC) (e.g., $LiMn_{1.5}Ni_{0.5}O_4$); one or more materials with a layered structure, such as lithium cobalt oxide ($LiCoO_2$), lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$) (e.g., $LiMn_{0.33}Ni_{0.33}Co_{0.33}O2$), or a lithium nickel cobalt metal oxide ($LiNi_{(1-x-y)}Co_xM_yO_2$, where $0<x<0.2$, $y<0.2$, and M may be Al, Mg, Ti, or the like); or a lithium iron polyanion oxide with olivine structure, such as lithium iron phosphate ($LiFePO_4$) (LFP), lithium manganese-iron phosphate ($LiMn_{2-x}Fe_xPO_4$, where $0<x<0.3$) (LFMP), or lithium iron fluorophosphate ($Li_2FePO_4F$). In various aspects, the positive electrode 24 may comprise one or more electroactive materials selected from the group consisting of: NCM 111, NCM 532, NCM 622, NCM 811, NCMA, LFP, LMO, LFMP, LLC, and combinations thereof.

As discussed above, during discharge, the negative electrode 22 may contain a comparatively high concentration of intercalated lithium, which is oxidized into lithium ions and electrons. Lithium ions may travel from the negative electrode 22 to the positive electrode 24, for example, through the ionically conductive electrolyte 30 contained within the pores of an interposed porous separator 26. Concurrently, electrons pass through an external circuit 40 from the negative electrode 22 to the positive electrode 24. Such lithium ions may be assimilated into the material of the positive electrode 22 by an electrochemical reduction reaction. The battery 20 may be recharged or regenerated after a partial or full discharge of its available capacity by an external power source, which reverses the electrochemical reactions that transpired during discharge.

In certain instances, however, especially in instances of volume-expanding negative electroactive materials (e.g., aluminum (Al), germanium (Ge), tin (Sn)), a portion of the intercalated lithium often remains with the negative electrode 22. For example, as a result of conversion reactions and/or the formation of $Li_xSi$ and/or a solid electrolyte interphase (SEI) layer (not shown) on the negative electrode 22 during the first cycle, as well as ongoing lithium loss due to, for example, continuous solid electrolyte interphase (SEI) breakage and rebuild. The solid electrolyte interface (SEI) layer can form over the surface of the negative electrode 22, which is often generated by reaction products of anode materials (i.e., negative electroactive materials), electrolyte reduction, and/or lithium ion reduction. Such permanent loss of lithium ions may result in a decreased specific energy and power in the battery 20. For example, the battery 20 may experience an irreversible capacity loss of greater than or equal to about 5% to less than or equal to about 30% after the first cycle.

Lithiation, for example pre-lithiation of the electroactive materials prior to incorporation into the battery 20, may compensate for such lithium losses during cycling. For example, an amount of lithium prelithiated together with appropriate negative electrode capacity and/or positive electrode capacity ratio (N/P ratio) can be used to control electrochemical potential within an appropriate window so as to improve the cycle stability of the battery 20. Prelithiation can drive down the potential for silicon-containing electrodes. By way of non-limiting example, lithiation of silicon by direct reaction can be expressed by: $4.4xLi+Si \rightarrow Li_{4.4x}Si$, where $0 \leq x \leq 1$, while for electrochemical lithiation of silicon, it can be expressed as $4.4xLi^+ + 4.4xe^{-+} Si \rightarrow Li_{4.4x}Si$. In each instance, the reserved lithium can compensate for lithium lost during cycling, including during the first cycle, so as to decrease capacity loss over time.

Common lithiation methods, such as electrochemical, direct contact, and lamination methods; however, often require half-cell fabrication and teardown and/or high temperature chemical processes. Furthermore, it can be difficult to control an extent of lithiation that occurs during these processes. Further, these processes often involve highly reactive chemicals and require additional manufacturing steps. These may be time consuming and potentially expensive processes. Further, such processes also commonly produce unworkable materials, for example anodes having undesirable thicknesses. The present disclosure provides a lithiation additive, and methods of using the same, which can help to address these challenges.

For example, in various aspects, the positive electrode 24 may further include a lithiation additive (not shown) that provides, or serves as, a lithium reservoir in the cell 20. The lithiation additive may improve both the cycle life and the density of the energy density. In various aspects, the lithiation additive may be a mixture of a lithium-containing material and one or more metal particles. For example, the lithiation additive may include greater than or equal to about 0.1 wt. % to less than or equal to about 95 wt. % of the lithium-containing material, and greater than or equal to about 0.1 wt. % to less than or equal to about 95 wt. % of the one or more metal particles. The lithiation additive may include greater than or equal to 0.1 wt. % to less than or equal to 95 wt. % of the lithium-containing material, and greater than or equal to 0.1 wt. % to less than or equal to 95 wt. % of the one or more metal particles.

In various aspects, the lithium-containing material may be represented by LiX, where X is hydrogen (H), oxygen (O), nitrogen (N), fluorine (F), phosphorous (P), or sulfur (S). The one or more metal particles (M) may include iron (Fe), copper (Cu), cobalt (Co), manganese (Mn), or any combination thereof. In certain variations, the lithiation additive (e.g., LiF/Fe) may be mixed with the positive electroactive material (e.g., NCM 622) to form a slurry that is disposed on or adjacent to one or more surfaces of the positive electrode current collector 34, and in certain variations, dried, to form the positive electrode 24.

During a first or initial cell cycle, the lithiation additive reacts to release lithium into the cells. For example, in certain variations, when the lithiating additive includes lithium fluoride as the lithium-containing material and iron as the metal particle, one or both of the following reactions may occur:

$$3LiF+Fe \rightarrow 2Li^{+}+2e^{-}+LiFeF_{3} \quad (I)$$

$$LiFeF_{3} \rightarrow FeF_{3}+e^{-}+Li+ \quad (II)$$

In particular, the first reaction may occur when a potential of 2.1 V (vs Li/Li$^+$) is reached, and the second reaction may occur when a potential of 3.4 V (vs Li/Li$^+$) is reached. As illustrated, in each instance, lithium ions (Li$^+$) are released into the surrounding cell environment.

An amount of pre-lithiation may be controlled by varying an amount of the lithiation additive in the positive electrode 24. For example, in certain variations, doubling the amount of lithiation additive in the positive electrode 24 may double the capacity derived from the lithiation additive, thereby changing the prelithiation degree in the negative electrode 22. In various aspects, the positive electrode 24 may include greater than or equal to about 0.1 wt. % to less than or equal to about 30 wt. %, optionally greater than or equal to about 1 wt. % to less than or equal to about 15 wt. %, of the lithiation additive. The positive electrode 24 may include greater than or equal to 0.1 wt. % to less than or equal to 30 wt. %, optionally greater than or equal to 1 wt. % to less than or equal to 15 wt. %, of the lithiation additive.

In various aspects, inclusion of the lithiation additive in the positive electrode 24 may contribute to a weight reduction of the battery 20. For example, graphite (4.4 mAh/cm$^2$) may be used as the negative electroactive material in the negative electrode 22. In such instances, 1.43 mg of a lithiation additive (e.g., LiF/Fe) may be included in the battery 20 to compensate the first cycle capacity loss, in accordance with various aspects of the present disclosure, whereas 3.03 mg of NMC622 would be need to compensate for the same capacity loss, evidencing a weight reduction.

With renewed reference to FIG. 1, in certain variations, the positive electroactive material(s) in the positive electrode 24 may be optionally intermingled with an electronically conducting material that provides an electron conduction path and/or at least one polymeric binder material that improves the structural integrity of the electrode 24. For example, the positive electroactive material(s) in the positive electrode 24 may be optionally intermingled (e.g., slurry casted) with binders like polyimide, polyamic acid, polyamide, polysulfone, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, or lithium alginate. Electrically conducting materials may include carbon-based materials, powdered nickel or other metal particles, or a conductive polymer. Carbon-based materials may include, for example, particles of graphite, acetylene black (such as KETJEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used.

In various aspects, the positive electrode 24 may include greater than or equal to about 5 wt. % to less than or equal to about 99 wt. %, optionally greater than or equal to about 10 wt. % to less than or equal to about 99 wt. %, and in certain variations, greater than or equal to about 50 wt. % to less than or equal to about 98 wt. %, of the positive electroactive material(s); greater than or equal to about 0.1 wt. % to less than or equal to about 30 wt. %, optionally greater than or equal to about 1 wt. % to less than or equal to about 15 wt. %, of the lithiation additive; greater than or equal to 0 wt. % to less than or equal to about 40 wt. %, and in certain aspects, optionally greater than or equal to about 1 wt. % to less than or equal to about 20 wt. %, of the electronically conducting material; and greater than or equal to 0 wt. % to less than or equal to about 40 wt. %, and in certain aspects, optionally greater than or equal to about 1 wt. % to less than or equal to about 20 wt. %, of the at least one polymeric binder.

In various aspects, the positive electrode 24 may include greater than or equal to 5 wt. % to less than or equal to 99 wt. %, optionally greater than or equal to 10 wt. % to less than or equal to 99 wt. %, and in certain variations, greater than or equal to 50 wt. % to less than or equal to 98 wt. %, of the positive electroactive material(s); greater than or equal to 0.1 wt. % to less than or equal to 30 wt. %, optionally greater than or equal to 1 wt. % to less than or equal to 15 wt. %, of the lithiation additive; greater than or equal to 0 wt. % to less than or equal to 40 wt. %, and in certain aspects, optionally greater than or equal to 1 wt. % to less than or equal to 20 wt. %, of the electronically conducting material; and greater than or equal to 0 wt. % to less than or equal to 40 wt. %, and in certain aspects, optionally greater than or equal to 1 wt. % to less than or equal to 20 wt. %, of the at least one polymeric binder.

In various aspects, the present disclosure provides methods of creating a lithium reservoir in an electrochemical cell that cycles lithium ions, such as the battery 20 illustrated in FIG. 1. For example, the method may include forming a positive electrode. As detailed above, the positive electrode includes, among other things, a positive electroactive material and a lithiation additive. Forming the positive electrode may include preparing a slurry including the positive electroactive material and the lithiation additive and other cathode materials (e.g., electrolyte, binder, and/or electronically conducting material) and disposing or casting the slurry onto one or more surfaces of a positive electrode current collector (for example, like the positive electrode current collector 34 illustrated in FIG. 1). In certain variations, forming the positive electrode may include drying the slurry disposed or coated on to the positive electrode current collector.

In various aspects, the method may further include assembling the battery. For example, the positive electrode including the positive electroactive material may be substantially aligned with a negative electrode (for example, like the negative electrode 22 illustrated in FIG. 1). As discussed above, the negative electrode may include a silicon-containing negative electroactive material. In certain variations, prior to assembling the battery, the method may include slurry casting a negative electroactive material and other anode materials (e.g., electrolyte, binder, and/or electronically conducting material) onto one or more surfaces of a negative electrode current collector (for example, like the negative electrode current collector 32 illustrated in FIG. 1). In various aspects, the battery may have a negative electrode capacity for lithium to positive electrode capacity for lithium (N/P) ratio of greater than or equal to about 1 to less than or equal to about 5. The battery may have a negative electrode capacity for lithium to positive electrode capacity for lithium (N/P) ratio of greater than or equal to 1 to less than or equal to 5.

Further still, the method may include cycling the assembled battery. For example, the method may include charging the battery to within a first predetermined voltage window and then discharging the battery to a second predetermined voltage window, where the second voltage window is less than the first voltage window. For example, the first voltage window may be greater than or equal to about 1.5 V to less than or equal to about 4.6 V, and in certain aspects, optionally about 4.2 V. The first voltage window may be greater than or equal to 1.5 V to less than or equal to 4.6 V, and in certain aspects, optionally 4.2 V. The second voltage window may be greater than or equal to about 2.5 V to less than or equal to about 4.3 V, optionally about 3.2V, and in certain aspects, optionally about 3.0 V. The second voltage window may be greater than or equal to 2.5 V to less than or equal to 4.3 V, optionally 3.2V, and in certain aspects, optionally 3.0 V. In performing such voltage changes, a portion of the capacity remains with the negative electrode as a lithium reservoir.

The battery including the lithium reservoir may be subsequently cycled. An operational voltage window of the battery may be greater than or equal to about 2.5 V to less than or equal to about 4.5 V, and in certain aspects, optionally greater than or equal to about 3.0 V to less than or equal to about 4.2V. The operational voltage window of the battery may be greater than or equal to 2.5 V to less than or equal to 4.5 V, and in certain aspects, optionally greater than or equal to 3.0 V to less than or equal to 4.2V.

Certain features of the current technology are further illustrated in the following non-limiting example.

EXAMPLE

An example cell can be prepared in accordance with various aspects of the present disclosure. The example cell can include for example a negative electrode comprising a negative electroactive material (e.g., graphite) that is substantially aligned with a positive electrode comprising a positive electrode material (e.g., NMC622) and a lithiation additive, where the lithiation additive includes a lithium-containing material (e.g., lithium fluoride (LiF)) and one or more metals (e.g., iron (Fe)).

Figure 2:
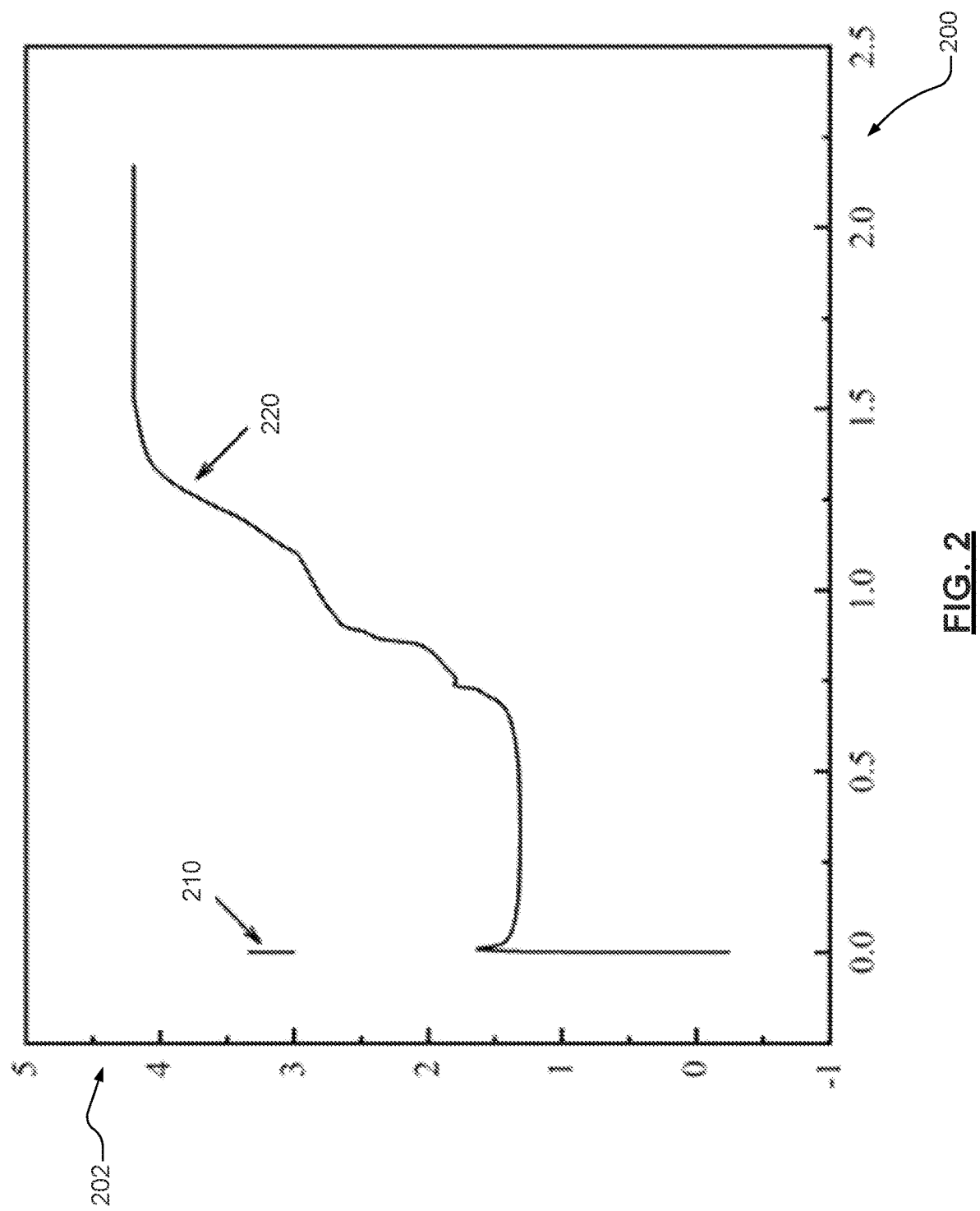
FIG. 2 is a graphical illustrating demonstrating discharge and charge capacities for an example battery cell prepared in accordance with various aspects of the present disclosure.

FIG. 2 is a graphical illustrating demonstrating both a discharge capacity 210 and a charging capacity 220 of the example cell, where the x-axis 200 is capacity (mAh) and the y-axis 202 is voltage (V). As illustrated, capacity is released during the first charging process 220, but no capacity is released during the discharging process 210, which indicates that all of the lithium ions released during the charging process were transferred to the negative electrode to prelithiate the negative electrode The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lithiation additive for a positive electrode, the lithiating additive comprising:
    a lithium-containing material comprising lithium fluoride (LiF); and
    iron (Fe) wherein the lithiation additive is configured for use with a positive electrode.

2. The lithiation additive of claim 1, wherein the lithiation additive comprises:
    greater than or equal to about 0.1 wt. % to less than or equal to about 95 wt. % of the lithium-containing material; and
    greater than or equal to about 0.1 wt. % to less than or equal to about 95 wt. % of the iron (Fe).

3. The lithiation additive of claim 1, wherein the positive electrode comprises greater than or equal to about 0.1 wt. % to less than or equal to about 30 wt. % of the lithiation additive.

4. The lithiation additive of claim 1, wherein the positive electrode comprises a positive electroactive material, and the lithiation additive is blended with the positive electroactive material.

5. The lithiation additive of claim 4, wherein the positive electroactive material is selected from the group consisting of: NCM 111, NCM 532, NCM 622, NCM 611, NCMA, LFP, LMO, LFMP, LLC, and combinations thereof.

6. A positive electroactive material layer comprising:
    a positive electroactive material; and
    a lithiation additive blended with the positive electroactive material, wherein the lithiation additive comprises iron (Fe) and a lithium-containing material comprising lithium fluoride (LiF).

7. The positive electroactive material layer of claim 6, further comprising one or more metals selected from the group consisting of: copper (Cu), cobalt (Co), manganese (Mn), and combinations thereof.

8. The positive electroactive material layer of claim 6, wherein the lithiation additive comprises:

greater than or equal to about 0.1 wt. % to less than or equal to about 95 wt. % of the lithium-containing material; and greater than or equal to about 0.1 wt. % to less than or equal to about 95 wt. % of the iron (Fe).

9. The positive electroactive material layer of claim 6, wherein the positive electrode comprises greater than or equal to about 0.1 wt. % to less than or equal to about 30 wt. % of the lithiation additive.

10. The positive electroactive material layer of claim 6, wherein the positive electroactive material is selected from the group consisting of: NCM 111, NCM 532, NCM 622, NCM 611, NCMA, LFP, LMO, LFMP, LLC, and combinations thereof.

11. An electrochemical cell that cycles lithium ions, wherein the electrochemical cell comprises:
    a positive electrode comprising:
        a positive electroactive material; and
        a lithiation additive blended with the positive electroactive material, wherein the lithiation additive comprises a lithium-containing material comprising iron (Fe) and lithium fluoride (LiF).

12. The electrochemical cell of claim 11, further comprising one or more metals selected from the group consisting of: copper (Cu), cobalt (Co), manganese (Mn), and combinations thereof.

13. The electrochemical cell of claim 11, wherein the lithiation additive comprises:
    greater than or equal to about 0.1 wt. % to less than or equal to about 95 wt. % of the lithium-containing material; and
    greater than or equal to about 0.1 wt. % to less than or equal to about 95 wt. % of the iron (Fe).

14. The electrochemical cell of claim 11, wherein the positive electrode comprises greater than or equal to about 0.1 wt. % to less than or equal to about 30 wt. % of the lithiation additive.

15. The electrochemical cell of claim 11, wherein the positive electroactive material is selected from the group consisting of: NCM 111, NCM 532, NCM 622, NCM 611, NCMA, LFP, LMO, LFMP, LLC, and combinations thereof.

16. The electrochemical cell of claim 11, wherein the electrochemical cell further comprises:
    a negative electrode comprising a negative electroactive material.

17. The electrochemical cell of claim 16, wherein the negative electroactive material is a volume-expanding negative electroactive material.

18. The lithiation additive of claim 1, wherein the lithium-containing material is a first lithium-containing material, and the lithiation additive further comprises a second lithium-containing material represented by LiX, where X is hydrogen (H), oxygen (O), nitrogen (N), phosphorous (P), or sulfur (S).

19. The lithiation additive of claim 1, further comprising one or more metals selected from the group consisting of: copper (Cu), cobalt (Co), manganese (Mn), and combinations thereof.

20. The positive electroactive material layer of claim 6, wherein the lithium-containing material is a first lithium-containing material, and the lithiation additive further comprises a second lithium-containing material represented by LiX, where X is hydrogen (H), oxygen (O), nitrogen (N), phosphorous (P), or sulfur (S).

* * * * *